(12) United States Patent
Manthoulis et al.

(10) Patent No.: US 8,385,229 B2
(45) Date of Patent: Feb. 26, 2013

(54) WEB BASED CAPACITY MANAGEMENT (WBCM) SYSTEM

(75) Inventors: Orestis Manthoulis, Sausalito, CA (US); Peter Wong, Newark, CA (US); Frederick Armanino, San Antonio, TX (US); Raghvendra G. Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 91 days.

(21) Appl. No.: 12/637,399

(22) Filed: Dec. 14, 2009

(65) Prior Publication Data

US 2010/0131894 A1  May 27, 2010

Related U.S. Application Data

(63) Continuation of application No. 11/234,512, filed on Sep. 23, 2005, now Pat. No. 7,656,808, which is a continuation of application No. 10/345,106, filed on Jan. 15, 2003, now Pat. No. 6,963,542.

(51) Int. Cl.
*G06F 3/048* (2006.01)
(52) U.S. Cl. ......... 370/254; 370/241; 370/463; 715/764
(58) Field of Classification Search .......................... None
See application file for complete search history.

(56) References Cited

U.S. PATENT DOCUMENTS

| 4,975,836 | A | | 12/1990 | Hirosawa et al. |
|---|---|---|---|---|
| 5,359,599 | A | | 10/1994 | Destouesse et al. |
| 5,805,819 | A | * | 9/1998 | Chin et al. .................. 709/224 |
| 5,845,277 | A | * | 12/1998 | Pfeil et al. ............................ 1/1 |
| 6,256,676 | B1 | | 7/2001 | Taylor et al. |
| 6,442,547 | B1 | | 8/2002 | Bowman-Amuah |
| 6,512,824 | B1 | | 1/2003 | Hsieh et al. |
| 6,556,659 | B1 | | 4/2003 | Bowman-Amuah |
| 6,704,303 | B1 | | 3/2004 | Bowman-Amuah |
| 6,707,812 | B1 | | 3/2004 | Bowman-Amuah |
| 6,806,813 | B1 | | 10/2004 | Cheng et al. |
| 2002/0136369 | A1 | | 9/2002 | Robohm et al. |
| 2002/0152303 | A1 | | 10/2002 | Dispensa |
| 2002/0168054 | A1 | | 11/2002 | Klos et al. |
| 2002/0194326 | A1 | | 12/2002 | Gold et al. |
| 2003/0195892 | A1 | | 10/2003 | Dhanda |
| 2003/0200347 | A1 | * | 10/2003 | Weitzman .................. 709/310 |
| 2004/0139371 | A1 | * | 7/2004 | Wilson et al. ................. 714/43 |

* cited by examiner

*Primary Examiner* — Chi H. Pham
*Assistant Examiner* — Shick Hom
(74) *Attorney, Agent, or Firm* — Toler Law Group, PC

(57) ABSTRACT

A user interface for viewing network system data is provided and includes at least one company level view that includes a list of one or more service regions within a company, at least one regional level view that includes a list of one or more service markets within each of the one or more service regions, and at least one market level view that includes a list of one or more wire centers within the one or more service markets.

19 Claims, 5 Drawing Sheets

WEB BASED CAPACITY MANAGEMENT (WBCM) SYSTEM

REFERENCE TO PRIOR APPLICATION

The present application claims priority from and is a continuation of U.S. patent application Ser. No. 11/234,512 filed on Sep. 23, 2005, now U.S. Pat. No. 7,656,808, which is a continuation of U.S. patent application Ser. No. 10/345,106 filed on Jan. 15, 2003, now U.S. Pat. No. 6,963,542, the contents of each of which is expressly incorporated herein by reference in its entirety.

BACKGROUND

Telecommunication system management and operations involve many activities that are time-consuming, tedious, manual, and inefficient. Examples of such activities include service provisioning and inventory management of the many telecommunication elements involved in providing service to a large geographic region. Current techniques to manage inventory and to determine network deployment use databases and other operational support systems that are constructed based on manually inputted and updated engineering job orders as each telecommunication element is deployed or modified. With such systems, the status of network equipment is based on equipments lists, such as from purchase orders. With the large number of telecommunication elements and the manual and tedious nature of data input and data inaccuracies, the costs of maintaining such a system are high. In addition, the data needed to monitor and manage the network, such as traffic and performance data, is provided by different legacy systems from different vendors, resulting in additional difficulties with maintenance and operations of the telecommunication systems.

DETAILED DESCRIPTION

In a particular embodiment, a user interface for viewing network system data is provided and includes at least one company level view that includes a list of one or more service regions within a company, at least one regional level view that includes a list of one or more service markets within each of the one or more service regions, and at least one market level view that includes a list of one or more wire centers within the one or more service markets.

In a particular embodiment, a system is disclosed that includes a receiving component. The receiving component is configured to receive and process network system data. The system also includes a display component configured to display the processed network system data via a user interface. The user interface includes at least one company level view including a list of one or more service regions within a company. The user interface also includes at least one regional level view including a list of one or more service markets within each of the one or more service regions. The user interface includes at least one market level view including a list of one or more wire centers within the one or more service markets.

In a particular embodiment, a computer readable medium having a computer program embedded therein is disclosed. The computer program includes instructions to display at least one company level view including a list of one or more service regions within a company. The computer program also includes instructions to display at least one regional level view including a list of one or more service markets within each of the one or more service regions. The computer program includes instructions to display at least one market level view including a list of one or more wire centers within the one or more service markets.

Figure 1:
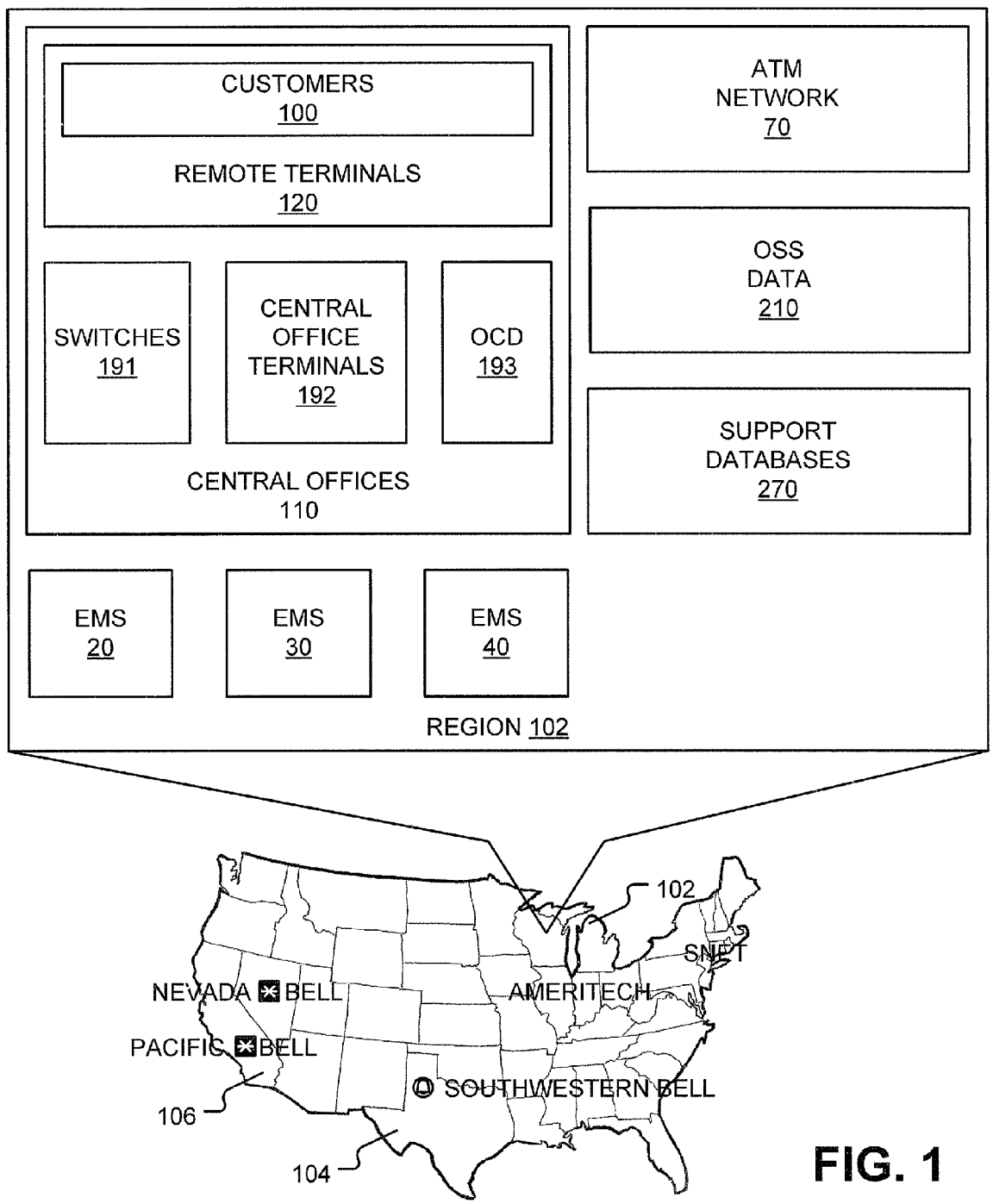
FIG. 1 is a block diagram that illustrates an embodiment of a system.

Referring to FIG. 1, an illustrated embodiment of a system is shown. The system includes central telecommunications offices 110, a telecommunication regions 102, 104, 106, interconnecting core devices 70, support databases 270, and operations and support data 210. The central offices 110 include generic switch devices 191, such as telephony switches, generic host devices 192, such as central office terminals, and generic aggregation devices 193, such as optical concentrator devices (OCD). The central offices 110 also include generic access devices 120 that service telecommunication customers 100. An example of a generic access device 120 is a remote terminal located near a plurality of customers where the remote terminal is coupled to a far-end optical concentrator device via a fiber-optic or other data transport communication line.

The example serviced geographic region 102 includes a plurality of different element management systems (EMS) 20, 30, and 40. The different EMS systems support a different group of telecommunication elements. For example, the EMS system 20 may support a first group of generic access devices and associated host devices. Similarly, the EMS system 40 may support a second group of generic access devices and associated generic host devices. The EMS system 30 may support a group of other devices, such as a group of generic aggregation devices. The example region 102 is a particular geographic telecommunication service coverage region for the Midwest portion of the United States. Other illustrated regions include a Southwest region 104 and a Pacific region 106. The illustrated regions may be associated with different brands. For example, the region 102 is associated with the Ameritech brand, the Southwest region 104 is associated with the Southwestern Bell brand, and the Pacific region 106 is associated with the Pacific Bell and the Nevada Bell brand. The system disclosed herein is applicable to other telecommunication service coverage regions, whether smaller or larger than the illustrated geographic regions described.

Figure 2:
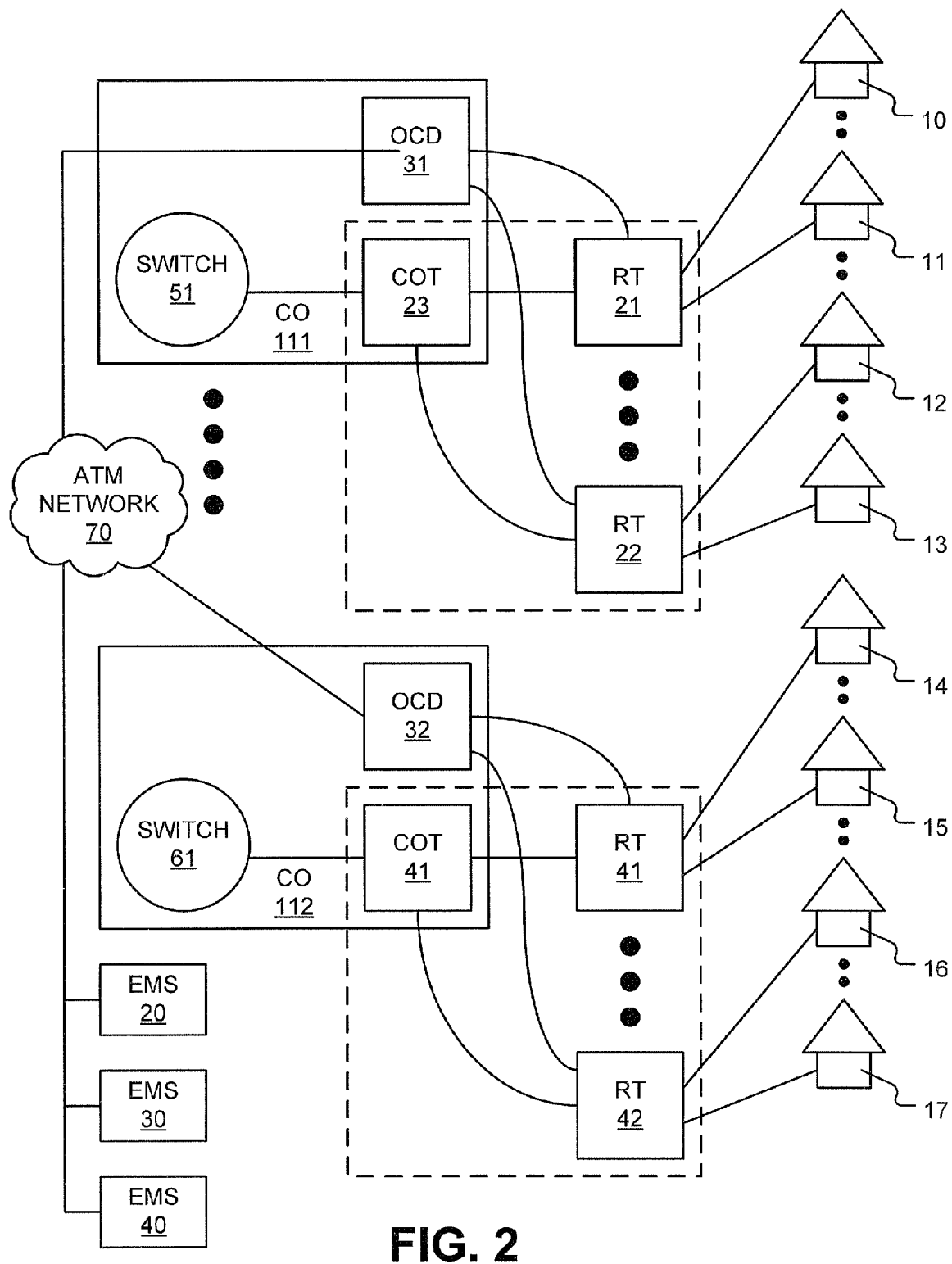
FIG. 2 is a general diagram that illustrates an embodiment of a particular telecommunication system configuration.

Referring to FIG. 2, a general diagram is provided to demonstrate how the various EMS systems 20, 30, 40 may be interconnected with various other telecommunication elements. As shown, a sample system configuration includes a first central office facility 111 and a second central office facility 112. The first central office facility 111 includes a telecommunications switch 51, a central office terminal (COT) 23, and an optical concentrator device (OCD) 31. The OCD 31 is coupled to an external data network, such as an ATM network 70.

The COT 23 is coupled to a first remote terminal 21 by a first telecommunication line and to a second remote terminal 22 by a second telecommunication line. The OCD 31 is similarly coupled to both the first remote terminal 21 and the second remote terminal 22 via data links. The first remote terminal 21 is coupled through a plurality of different telecommunication lines to a plurality of customers, such as residential/business facilities 10, 11. The second remote terminal 22 is coupled through a plurality of different telecommunication lines to a plurality of different customers, such as other residential/business facilities 12, 13.

The second central office facility 112 includes a telecommunications switch 61, a central office terminal (COT) 41, and an optical concentrator device (OCD) 32. The OCD 32 is coupled to the ATM network 70. The COT 23 is coupled to a third remote terminal 21 by a third telecommunication line and to a fourth remote terminal 22 by a fourth telecommunication line. The OCD 32 is coupled to the third and fourth remote terminals 41, 42 by data lines. The third remote terminal 41 is coupled through a plurality of different telecommunication lines to a plurality of customers, such as residential/business facilities 14, 15. The fourth remote terminal 42 is coupled through a plurality of different telecommunication lines to a plurality of different customers, such as other residential/business facilities 16, 17.

In this particular illustrative configuration, the first EMS 20 supports the first remote terminal 21, the second remote terminal 22, and the COT 23. The second EMS 30 supports the OCDs 31 and 32. The third EMS 40 supports the COT 41, the third remote terminal 41, and the fourth remote terminal 42. The EMS systems 20, 30, 40 are typically provided by the same vendors/manufacturers of the associated supported telecommunication elements. Thus, a vendor of the first and second remote terminals 21, 22 provides a specific EMS 20 that communicates data and can be used for operations, monitoring, and maintenance of the supported remote terminals 21, 22. Within a particular geographic region that includes many different telecommunication elements provided by different vendors, a plurality of different EMS systems, each with different vendor-specific interfaces may be deployed. An example of a representative EMS system is the Access Management System (AMS) provided by Alcatel, Inc.

Figure 3:
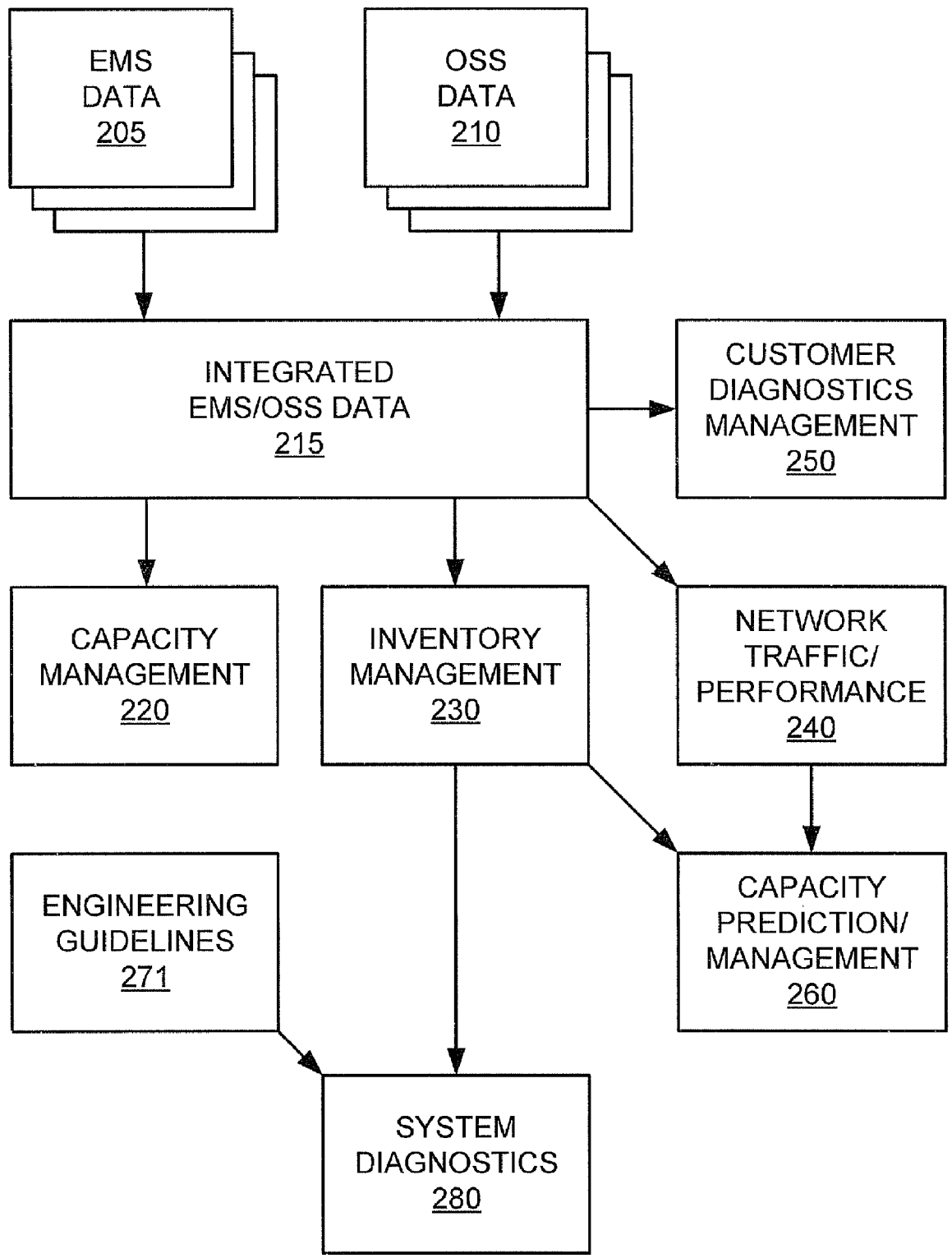
FIG. 3 is a functional block diagram that illustrates telecommunication actions that may be taken with respect to the systems of FIGS. 1 and 2.

Referring to FIG. 3, a functional description of a system that provides certain telecommunication actions with respect to the systems of FIGS. 1 and 2 is disclosed. The illustrated system includes EMS data 205, OSS data 210, and integrated EMS/OSS data module 215. The EMS data 205 is data that is provided by an EMS, such as EMS 20, 30, and 40. The OSS data is data from an operations and support system associated with a telecommunication system, such as a telephony switch or group of switches. The integrated EMS/OSS data module 215 is a combination of vendor-specific EMS data from different vendor EMS systems and generic OSS data from operations support systems. The combined EMS/OSS data 215 is formatted in a vendor-transparent common format for enhanced service provider use. An example of the common data format is comma delimited ASCII, which may be stored in a central database according to a defined business model.

The data may be organized and presented using a network systems engineering-defined rule base combining desired business and presentation models. In a particular illustrative embodiment, configuration data is extracted separately from each vendor's type of network element at least once per week. As a specific example, performance and statistical data maybe extracted daily for one hour or fifteen minute time intervals with five minute peaks, according to the level of detail needed to assess proper performance. The specific time intervals for data collection can vary. The central database is then updated with this information. The user interface may be a web browser interface that includes a number of different view levels, ranging from a summarized company level view down to a specific port level view. Additional examples of view levels are regional level, market level, wire center level, system level, terminal level, distribution area level, channel bank level, card level, and virtual interface group level. Each view level includes different ways to display the data. For example, at the company level, a user may want to see the total number of network elements deployed, the total number of customers in service, the total number of outages, or the average data speeds being provided to customers. Other data view types include an overview, specific details of identified network elements, routes, and channel banks. The presentation data can also be viewed for a selected region or distribution area. The same type of data presentation may be viewed for voice and data service.

Once the EMS data 205 and OSS data 210 has been integrated and provided in a useable format, the integrated EMS/OSS data 215 has many uses. For example, the integrated EMS/OSS data 215 may be used to provide a real-time capacity management function 220, inventory management 230, network traffic/performance 240, and customer diagnostics and measurement 250. In addition, based on the common inventory management and network traffic performance monitoring that is provided for different vendor equipment within a selected region, capacity prediction and management 260 may also be provided for such region. Further, based on suitable engineering guidelines and policies 271, overall system diagnostics 280 may also be performed on telecommunication elements within the region.

Rules can be applied to the integrated data to characterize the data and to define appropriate thresholds. Examples of data characterization include defining the number of ports in service or calculating a customer's loop length. Thresholds specify that a certain configuration, traffic, or performance number has been reached, and are defined and customized to fit the needs of a particular user. For example, a planner may need to know when a channel bank reaches 50% capacity to allow time to order more equipment. An engineer may need to know when that same channel bank reaches 90% capacity in order to study its performance. Users of the system can be notified via email or other notification methods when a particular threshold has been exceeded (e.g. bandwidth utilization, VCC exhaust, DA exhaust, bit error rates, line characteristics, etc.). When a monitored threshold is exceeded, a red or yellow alarm may be displayed to provide a visual indication to a system user, resulting in efficient provisioning and monitoring of network elements.

For example, the first set of EMS data includes information about the Network Elements that it is associated with. The available data includes the system name, the IP address, the administrative state, the configuration type, and the version of that telecommunication element. In addition, the detail information about all the banks in the unit is provided, including all the cards in each slot of the system and each port of each card. The name, the type, the CLEI code, the serial number, its primary service state, and secondary service name is the type of additional information that is available per card and per port.

Figure 4:
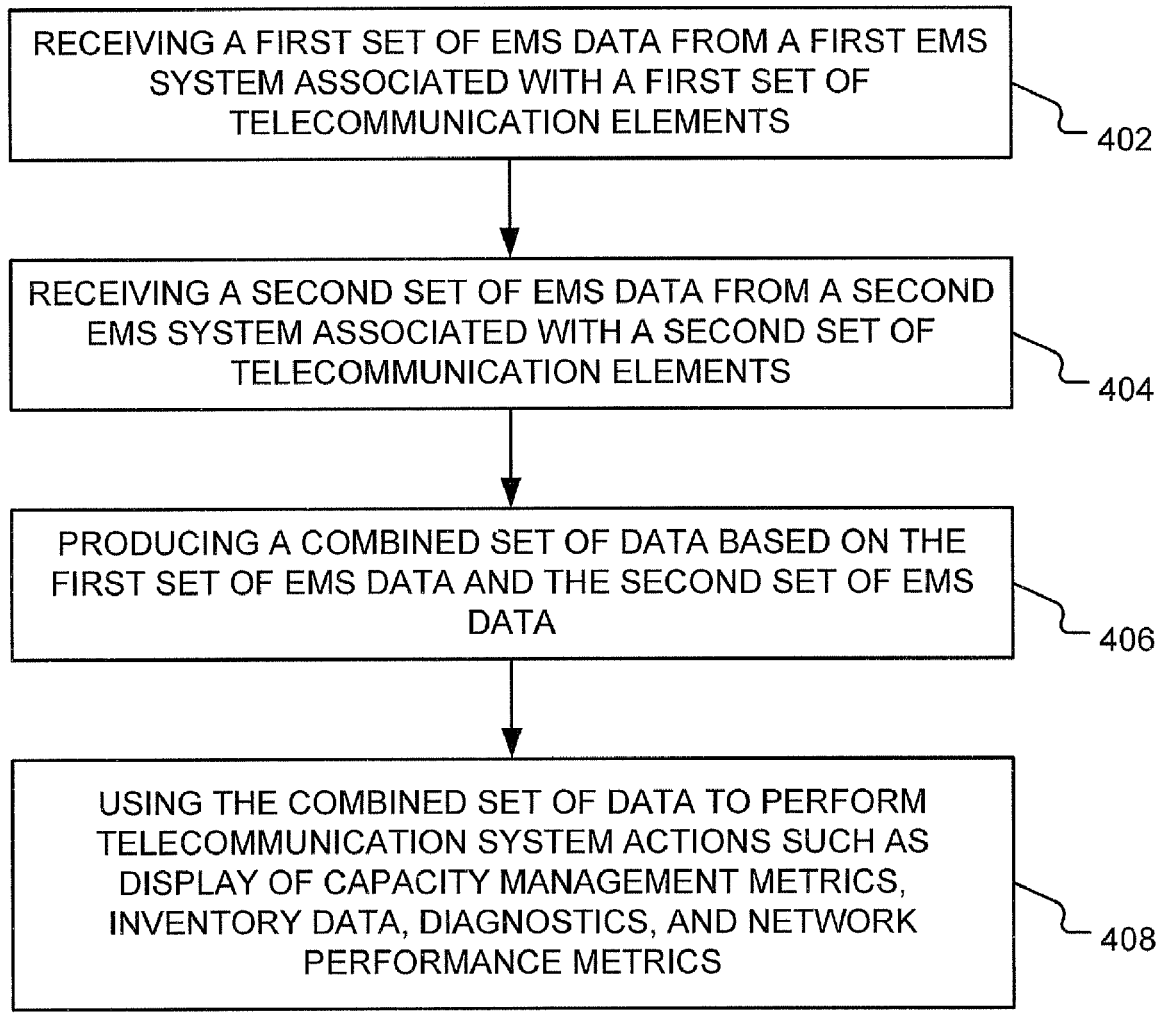
FIG. 4 is a flow chart that illustrates operation of an embodiment of a representative system.

An example of the data format, in this case in comma delimited ASCII format, is provided:
NODE,RT2,RT,NGDLC,DLC#-4024,(w_A: 09.01.02, b_A: 00.00.00, w_B: 09.01.02, b_B: 00.00.00)
NODE,RT3,RT,NGDLC,DLC#-4024,(w_A: 09.01.02, b_A: 00.00.00, w_B: 09.01.02, b_B: 00.00.00)
NODE,RT4,RT,NGDLC,DLC#-4024,(w_A: 09.01.02, b_A: 00.00.00, w_B: 09.01.02, b_B: 00.00.00)
BANK,DLC#-4024,COT,CCB
BANK,DLC#-4024,COT-1,CBB BANK,DLC#-4024,RT1,CCB
EQUIPMENT,DLC#-4024,COT-ACU,ACU,
  SLPQ0B76AE,1982201,IS-NR,
EQUIPMENT,DLC#-4024,COT-MTI,MTI,SLTE103BAA,
  667855,IS-NR,
EQUIPMENT,DLC#-4024,COT-CCB,CCB,2609415,IS-
  NR,SEA
EQUIPMENT,DLC#-4024,COT-OTE-A,OTU,
  SLTRCB4BAB,2677726,IS-NR,
EQUIPMENT,DLC#-4024,COT-OTE-B,OTU,
  SLTRCB4BAB,2677726,IS-NR,
EQUIPMENT,DLC#-4024,COT-OTW-A,OTU,
  SLTRCB4BAB,2677726,IS-NR, A second set of data can be available from other EMS systems, or an OSS system. For example, from an internal OSS system, information is collected that is associated with the customer in each port of the telecommunication element described above. The OSS data can provide the Circuit ID of the customer, its telephone number, the date the service that the customer requested was activated, the profile of the service that was requested, etc Referring to FIG. 4, an embodiment of a method of producing and using the integrated ESS/OSS data is shown. A first set of EMS data from a first EMS system associated with a first set of telecommunication elements is received, at 402. A second set of EMS data from a second EMS system associated with a second set of telecommunication elements is received, at 404. A combined set of data based on the first set of EMS data and based on the second set of EMS data is produced, at 406. The combined set of data is then used to perform telecommunication system actions, such as display of capacity management metrics, inventory data, diagnostics, and network performance metrics, at 408. While the above method refers to the combined set of EMS data from two or more EMS systems, it should be understood that other data may also be combined with the EMS data to produce an integrated data set, such as data from supporting telecommunication systems, such as the OSS data from OSS systems and other support databases described herein. In addition, the combined set of data may be reformatted into a common data format that may be different than the data format of the first set of EMS data and the second set of EMS data. The reformatted data may be more easily used as a platform to perform the various desired telecommunication system actions. The reformatted data may be presented to users in a user-friendly format, such as via a web browser.

Figure 5:
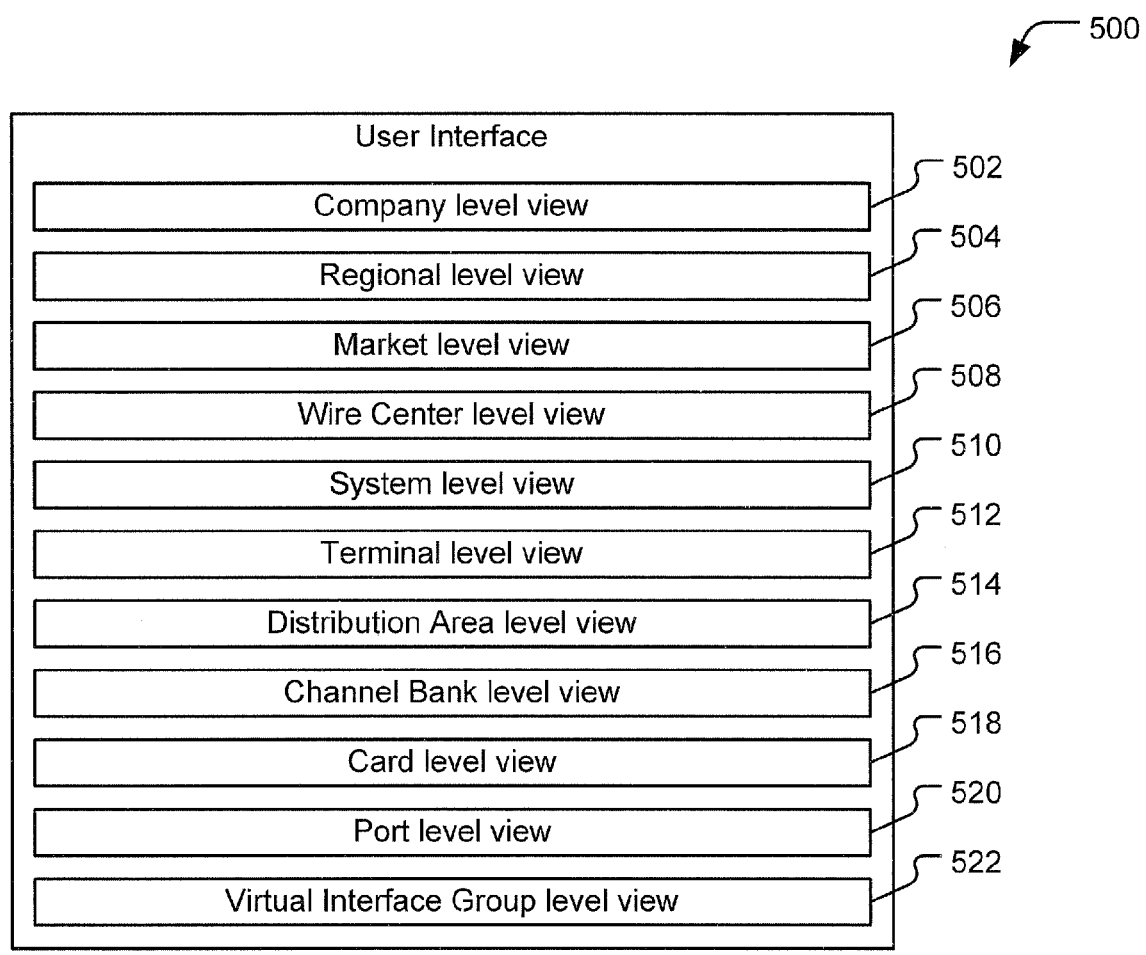
FIG. 5 is a diagram of an embodiment of a user interface for viewing network management data.

Referring to FIG. 5, an exemplary embodiment, of a user interface for viewing network management data is shown and is designated 500. As shown, the user interface 500 includes at least one of the following view levels: a company level view 502, a regional level view 504, a market level view 506, a wire center level view 508, a system level view 510, a terminal level view 512, a distribution level view 514, a channel bank level view 516, a card view level 518, a port level view 520, and a virtual interface group level view.

In a particular embodiment, a user can select each of the level views 502, 504, 506, 508, 510, 512, 514, 516, 518, 520 in order to view more information associated with each level. For example, in a particular embodiment, the company view level 502 can include a list of service regions within a company. Further, the company level view 502 can include at least one of the following: details associated with the remote terminals within each of the service regions, details associated with the service distribution areas within each of the service regions, details associated with the cards within each of the service regions, details associated with the ports within each of the service regions, a virtual interface group usage history associated with each of the service regions, a total number of channel banks, a total number of asymmetrical digital subscriber line (ADSL) channel banks, a channel bank concentration value, and a remote terminal concentration value.

In a particular embodiment, the regional level view 504 includes a list of service markets within each of the service regions. Additionally, the regional level view 504 can include at least one of the following: details associated with the remote terminals within each of the service markets, details associated with service distribution areas within each of the service markets, details associated with the cards within each of the service markets, details associated with or more ports within each of the service markets, and a virtual interface group usage history associated with each of the service markets.

In another particular embodiment, the market level view 506 includes a list of the wire centers within the service markets. In an exemplary, non-limiting embodiment, the each wire center is an eight character wire center. The market level view 506 can include at least one of the following: details associated with the remote terminals within each of the wire centers, details associated with the service distribution areas within each of the wire centers, details associated with the cards within each of the wire centers, details associated with or more ports within each of the wire centers, and a virtual interface group usage history associated with each of the wire centers.

In yet another particular embodiment, the wire center level view 508 includes a list of the systems within each of the wire centers. The wire center level view 508 can further include at least one of the following: details associated with the remote terminals within each of the systems, details associated with the service distribution areas within each of the systems, details associated with the cards within each of the systems, details associated with or more ports within each of the systems, details associated with the routes within each of the systems, and a virtual interface group usage history associated with each of the systems.

Further, in another particular embodiment, the system level view 510 can include a list of the central office terminals and the subtending remote terminals within each of the systems. The distribution area level view 514 can include a list of the cards located within the service distribution areas and the channel bank level view 516 can include a list of the cards within the channel banks.

The distribution area level view 514 can include at least one of the following: details associated with each of the cards within each of the service distribution areas, details associated with each of the ports within each of the service distribution areas, and a virtual interface group usage history associated with each of the service distribution areas. Moreover, the channel bank level view 516 can include details associated with each port within each of the cards.

In a particular embodiment, the card level view 518 includes a list of the ports on each of the cards within each of the service distribution areas and each of the cards located within each of the channel banks and details associated with each of the ports. Also, in a particular embodiment, the port level view 520 includes a list of the attributes associated with each of the ports and details associated with each of the ports. Moreover, the virtual interface group level view 522 can include a list of usage data associated with the virtual interface groups.

The disclosed method of collecting inventory and other equipment data using EMS systems directly provides a more accurate view of inventory and service provisioning compared to the alternative of deducing network deployment from engineering construction job orders. The disclosed method also reduces user training and saves time and costs of accessing information from a variety of separate legacy support systems. In addition, data accuracy is improved by querying the equipment installed in the network rather than inferring status of network equipment based on equipment lists from purchase orders. In addition, by combining data from different vendor equipment, the network operator is provided an integrated view of a heterogeneous multi-vendor network and an end-end view of circuit elements.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system, comprising:
   a receiving component configured to:
      receive a first set of element management system data and a second set of element management system data; and
      reformat the first set of element management system data and the second set of element management system data to produce reformatted element management system data having a common data format; and
   a display component configured to use the reformatted element management system data to display network performance metrics via a user interface, the user interface comprising:
      at least one company level view including a list of one or more service regions within a company;
      at least one regional level view including a list of one or more service markets within each of the one or more service regions; and
      at least one market level view including a list of one or more wire centers within the one or more service markets.

2. The system of claim 1, wherein the user interface further comprises:
   at least one wire center level view including a list of one or more systems within each of the wire centers; and
   at least one system level view including a list of one or more central office terminals and one or more subtending remote terminals within each of the one or more systems.

3. The system of claim 2, wherein the user interface further comprises:
   at least one distribution area level view including a list of one or more cards located within one or more service distribution areas; and
   at least one channel bank level view including a list of one or more cards within one or more channel banks.

4. The system of claim 3, wherein the user interface further comprises:
   at least one card level view including a list of one or more ports associated with each of the one or more cards within each of the one or more service distribution areas and associated with each of the one or more cards located within each of the one or more channel banks;
   at least one port level view including a list of one or more attributes associated with each of the one or more ports; and
   at least one virtual interface group level view including a list of usage data associated with one or more virtual interface groups.

5. The system of claim 1, wherein the at least one company level view further comprises details associated with one or more remote terminals within each of the one or more service regions, details associated with one or more service distribution areas within each of the one or more service regions, details associated with one or more cards within each of the one or more service regions, details associated with one or more ports within each of the one or more service regions, a virtual interface group usage history associated with each of the one or more service regions, a total number of channel banks, a total number of asymmetrical digital subscriber line channel banks, a channel bank concentration value, a remote terminal concentration value, or any combination thereof.

6. The system of claim 1, wherein the at least one regional level view further comprises details associated with one or more remote terminals within each of the one or more service markets, details associated with one or more service distribution areas within each of the one or more service markets, details associated with one or more cards within each of the one or more service markets, details associated with one or more ports within each of the one or more service markets, a virtual interface group usage history associated with each of the one or more service markets, or any combination thereof.

7. The system of claim 1, wherein the at least one market level view further comprises details associated with one or more remote terminals within each of the one or more wire centers, details associated with one or more service distribution areas within each of the one or more wire centers, details associated with one or more cards within each of the one or more wire centers, details associated with one or more ports within each of the one or more wire centers, a virtual interface group usage history associated with each of the one or more wire centers, or any combination thereof.

8. The system of claim 2, wherein the at least one wire center level view further comprises details associated with one or more remote terminals within each of the one or more systems, details associated with one or more service distribution areas within each of the one or more systems, details associated with one or more cards within each of the one or more systems, details associated with or more ports within each of the one or more systems, details associated with one or more routes within each of the one or more systems, a virtual interface group usage history associated with each of the one or more systems, or any combination thereof.

9. The system of claim 3, wherein the at least one distribution area level view further comprises details associated with each of the one or more cards within each of the one or more service distribution areas, details associated with one or more ports within each of the one or more service distribution areas, a virtual interface group usage history associated with each of the one or more service distribution areas, or any combination thereof.

10. The system of claim 3, wherein the at least one channel bank level view further comprises details associated with each port within each of the one or more cards within the one or more channel banks.

11. The system of claim 4, wherein the card level view further comprises details associated with each of the one or more ports.

12. The system of claim 4, wherein the port level view further comprises details associated with each of the one or more ports.

13. The system of claim 1, wherein each of the one or more wire centers is an eight character wire center.

14. The system of claim 1, wherein processing the network system data includes filtering the network system data based on a classification of a user of the user interface.

15. The system of claim 14, wherein filtering the network system data includes preventing the display of portions of the network system data.

16. A non-transitory computer readable medium having a computer program embedded therein, the computer program comprising:
    instructions to receive a first set of element management system data and a second set of element management system data;
    instructions to reformat the first set of element management system data and the second set of element management system data to produce reformatted element management system data having a common data format; and
    instructions to use the reformatted element management system data to display network performance metrics including:
    instructions to display at least one company level view including a list of one or more service regions within a company;
    instructions to display at least one regional level view including a list of one or more service markets within each of the one or more service regions; and
    instructions to display at least one market level view including a list of one or more wire centers within the one or more service markets.

17. The non-transitory computer readable medium of claim 16, further comprising instructions to notify a user of changes to network performance metrics based on a classification of the user.

18. The non-transitory computer readable medium of claim 17, wherein notification of the user is based at least on one of the network performance metrics exceeding a particular threshold.

19. The non-transitory computer readable medium of claim 18, wherein the network performance metrics are selected from the group consisting of bandwidth utilization, bit error rates, line characteristics, traffic performance, inventory performance, and vendor performance.

* * * * *